United States Patent [19]
Ikemori

[11] Patent Number: 4,705,363
[45] Date of Patent: Nov. 10, 1987

[54] ABERRATIONAL DETERIORATION PREVENTED ZOOM LENS

[75] Inventor: Keiji Ikemori, Yokohama, Japan

[73] Assignee: Canon Kabushiki Kaisha

[21] Appl. No.: 675,338

[22] Filed: Nov. 27, 1984

[30] Foreign Application Priority Data

Nov. 29, 1983 [JP] Japan .................. 58-225067
Feb. 16, 1984 [JP] Japan .................. 59-27567

[51] Int. Cl.$^4$ .......................... G02B 15/14
[52] U.S. Cl. .................. 350/427; 350/423; 350/450
[58] Field of Search ............... 350/423, 427, 449, 450

[56] References Cited

U.S. PATENT DOCUMENTS 3,918,797 11/1975 Tanano .................. 350/450 X
3,918,798 11/1975 Takano .................. 350/450 X
4,159,864 7/1979 Yasukuni et al. ........... 350/450 X
4,432,615 2/1984 Ikemori .................. 350/450 X

*Primary Examiner*—John K. Corbin
*Assistant Examiner*—Scott J. Sugarman
*Attorney, Agent, or Firm*—Toren, McGeady & Associates

[57] ABSTRACT

An aberrational deterioration preventing zoom lens comprising a lens group axially movable for zooming, another lens group axially movable for zooming which has a plurality of lens units, an aperture diaphragm on the object side of the rear lens unit having an opening the size of which is variable to determine the F-number of the entire system, and an optical stop lying on the image side of the rear lens unit which positions an intersection P at which a marginal ray of the on-axial pencil corresponding to the full aperture and an upper marginal ray of the off-axial light pencil going to the margin Q of an image plane intersect each other, to restrict the on-axial light flux.

17 Claims, 36 Drawing Figures

FIG. 5A PRIOR ART
FIG. 5B PRIOR ART
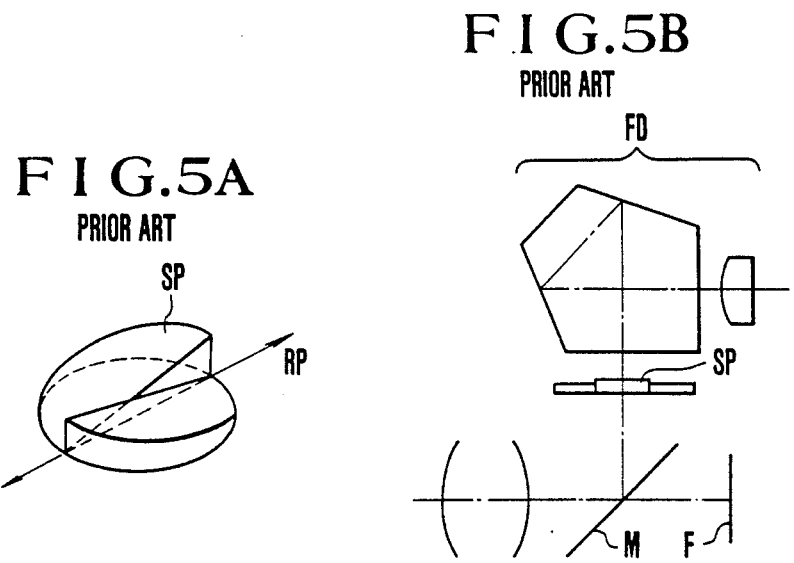
FIG. 6A PRIOR ART
IN-FOCUS
FIG. 6B PRIOR ART
NEAR-FOCUS
FIG. 6C PRIOR ART
FAR-FOCUS
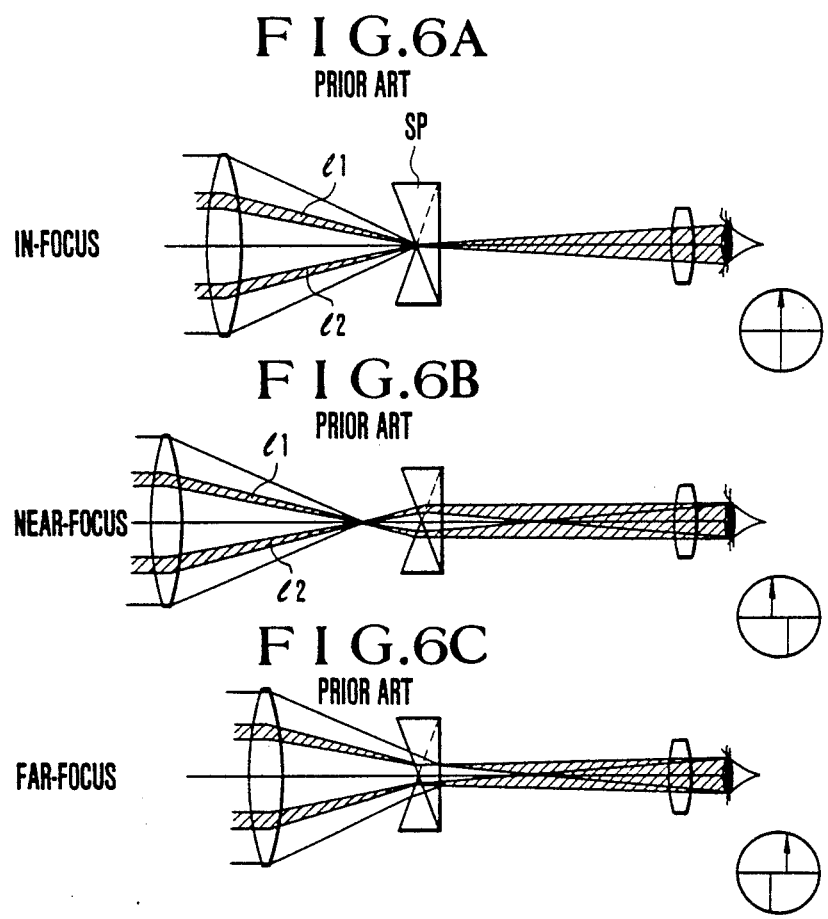

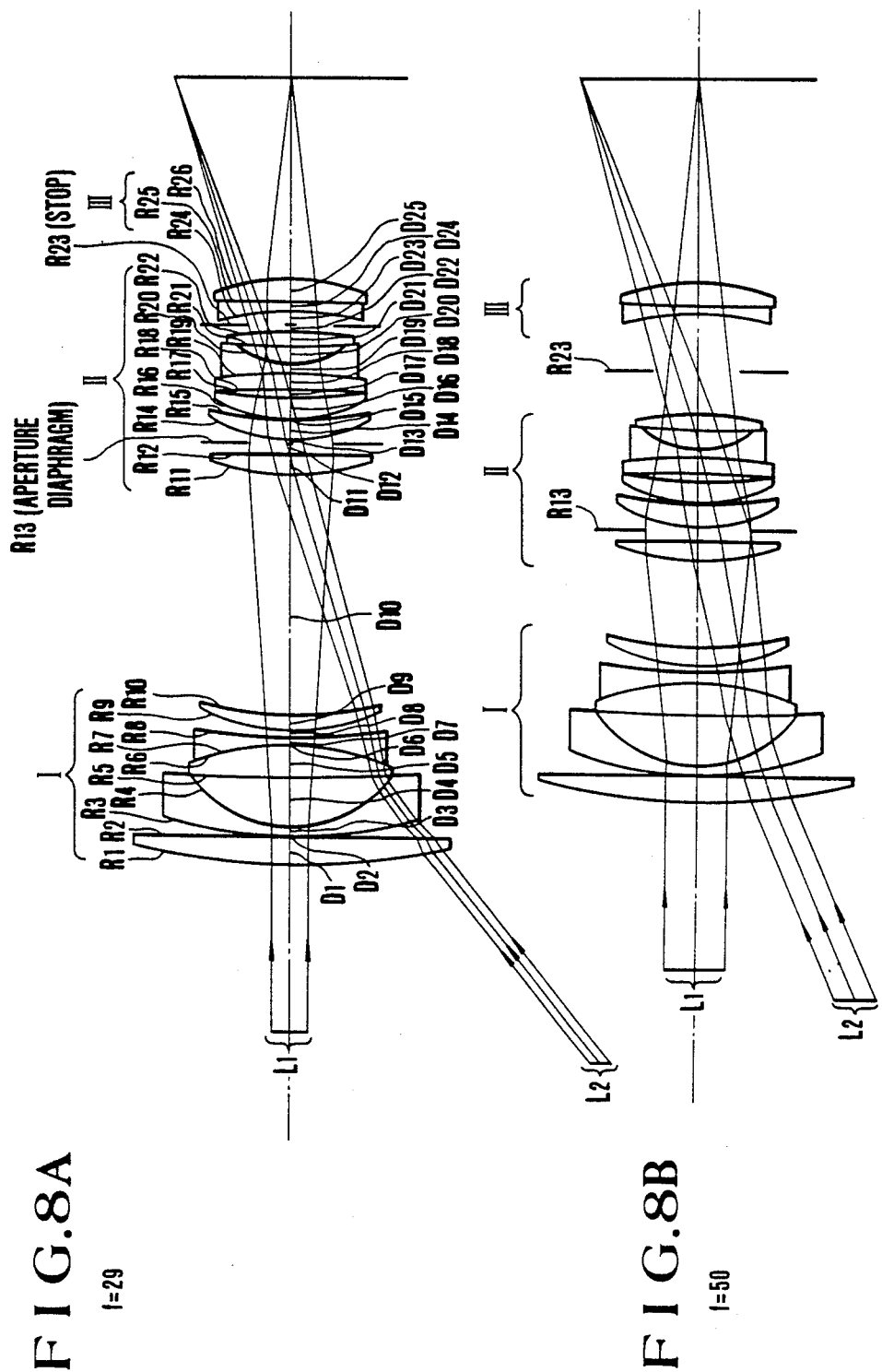

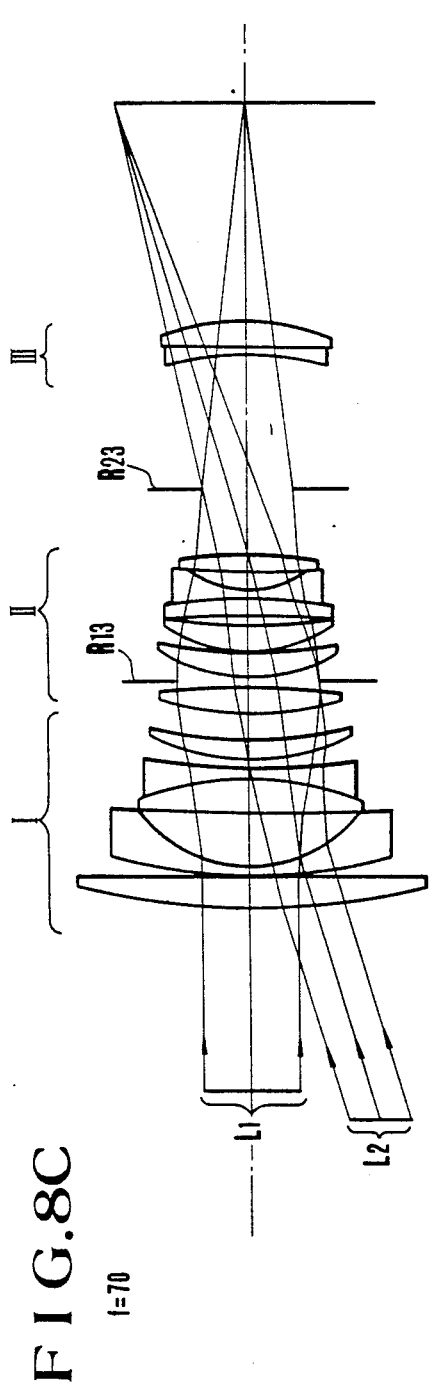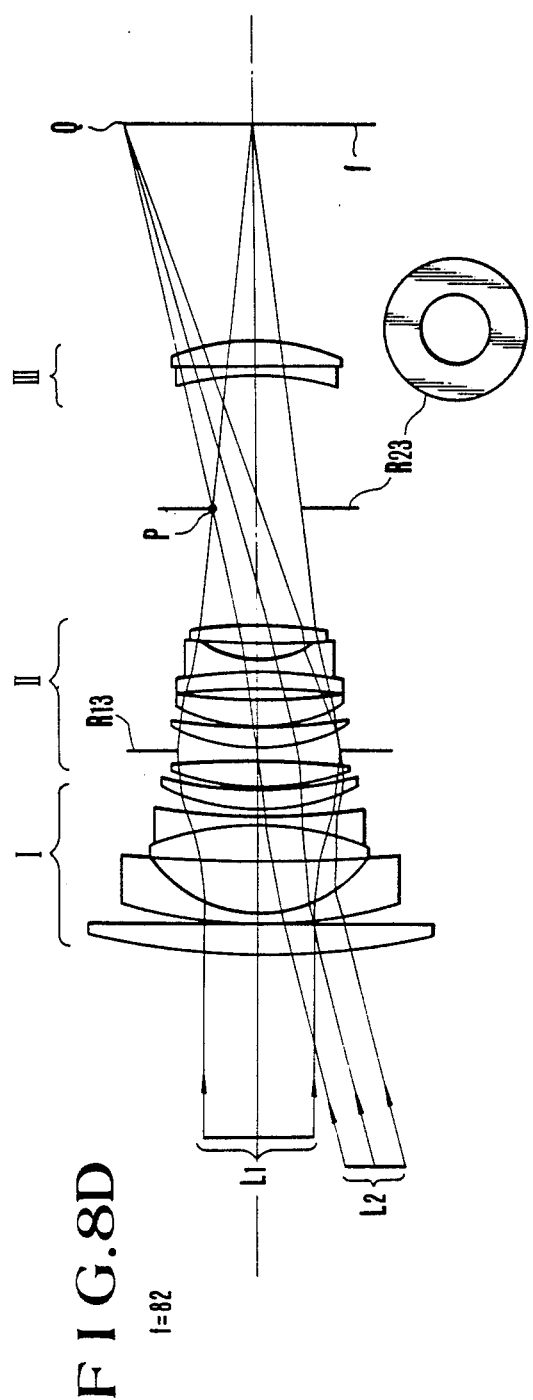
FIG.8C f=70
FIG.8D f=82

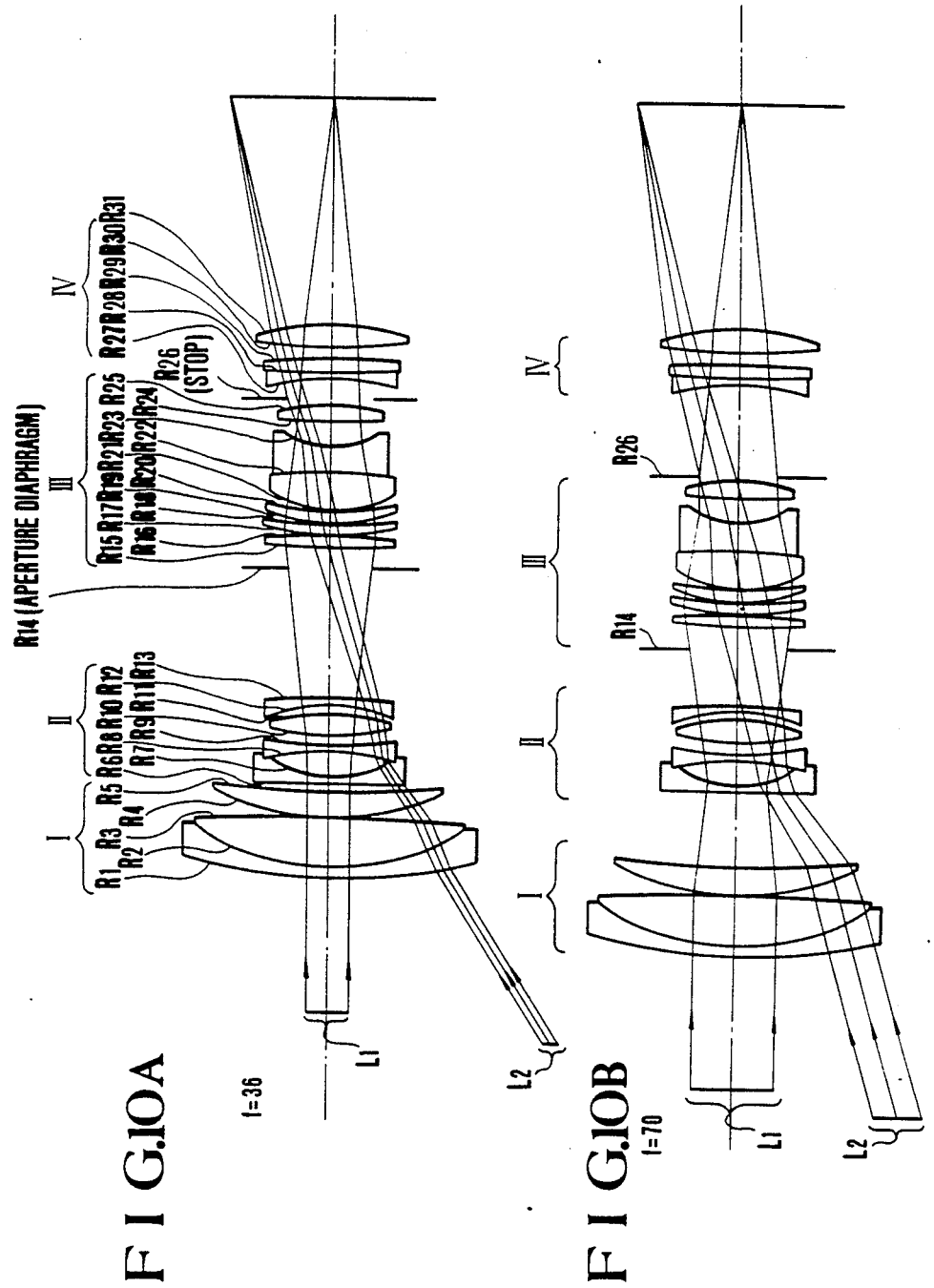

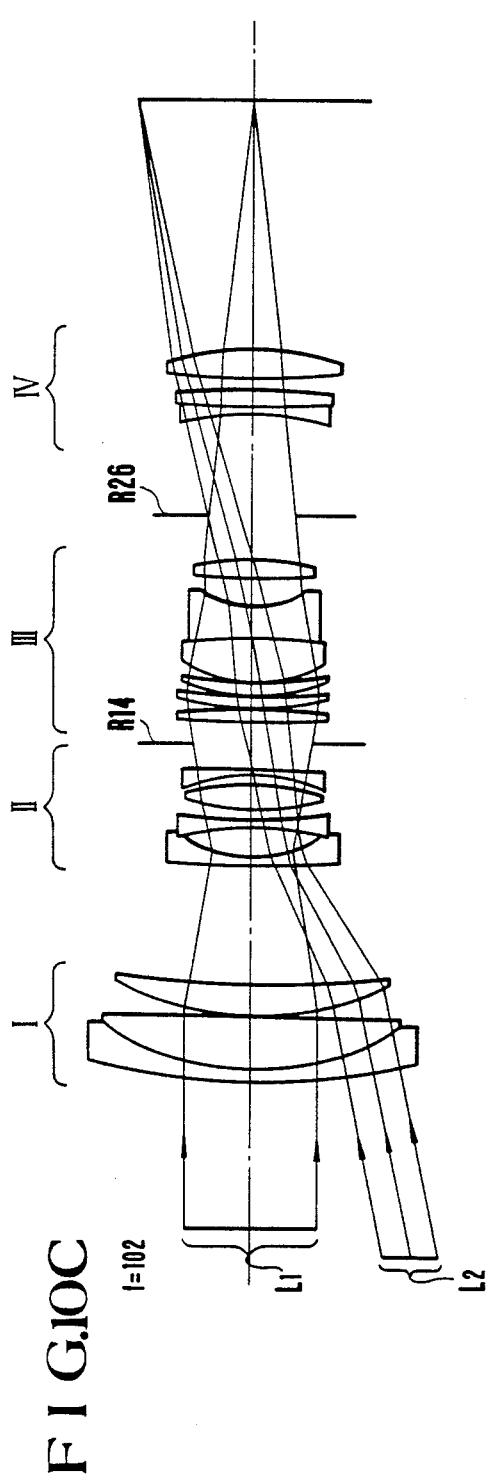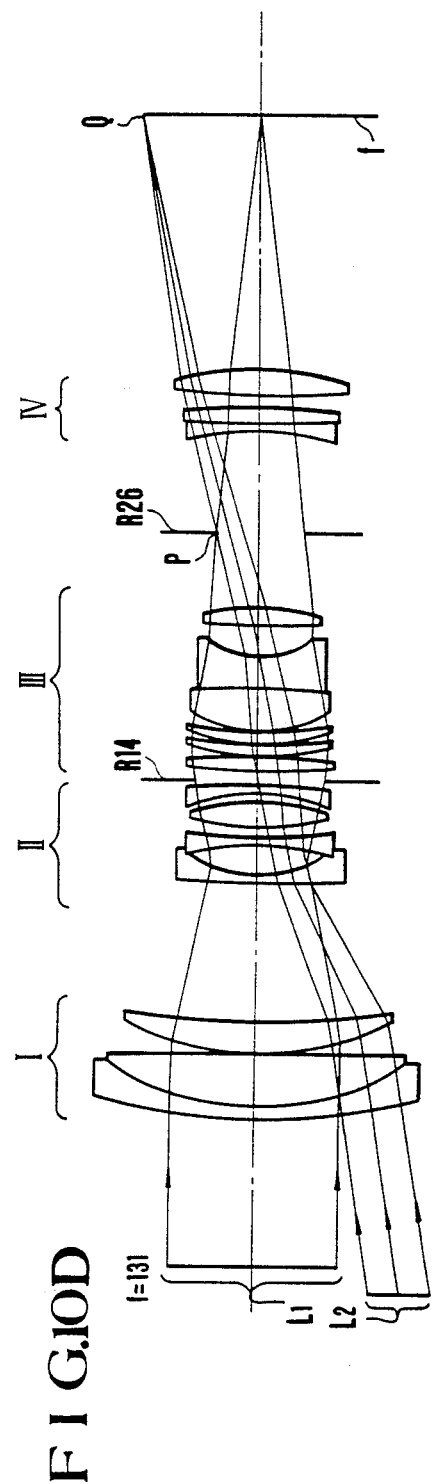
FIG. 10C
FIG. 10D

ABERRATIONAL DETERIORATION PREVENTED ZOOM LENS

BACKGROUND OF THE INVENTION

1. Field of the Invention

This invention relates to zoom lenses, and more particularly to a zoom lens provided, besides the photographic diaphragm for determining the F-number, with an optical stop for shading undesirable light.

2. Description of the Prior Art

In the past, many zoom lenses provided, besides the aperture diaphragm, a stop with a fixed aperture size opening. For example, U.S. Pat. No. 4,367,927 discloses a so-called 2-component zoom lens with the two components of negative and positive powers between which lies a stop to restrict part of the lower light flux of the off-axial light flux of the intermediate portion of the image, whereby coma flare is removed, and excessive vignetting is restricted. This stop, because of mainly removing the coma flare, is called the flare stop. And, ideally, the diameter of the opening of the flare stop is variable during zooming so that without mutilating the on-axial rays, that is, without giving any influence to the F-number, the object is accomplished.

Also, U.S. Pat. No. 4,190,323 discloses a zoom lens comprising negative and positive lens components followed rearwardly by a stop which moves independent from the zooming movement of the second lens component. In more detail, letting $\Delta X2$ denote the amount of movement of the second component, and $\Delta X3$ the amount of movement of the stop, the differential relation is expressed as $\Delta X3 = 0.5 \Delta X2$ so that, of the off-axis light flux of the uppermost portion of the image or the intermediate portion of the image, part of the upper light flux is restricted to improve the quality.

However, in these prior known zoom lenses, the aperture diaphragm moves as a unit with the second lens component during zooming. Therefore, in order to maintain a constant full open aperture value during zooming, because the maximum diameter of the aperture opening is determined at the telephoto end of the zooming range, and also the effective diameters of the lenses just in front and just behind the diaphragm in the second lens component are determined at the telephoto end, there is a need to partially close down the diaphragm for the full open aperture in zooming positions other than the telephoto end.

Most of the present diaphragm mechanisms have, as shown in FIGS. 1 to 3, their opening shape defined by the blades becoming a true circle only when the size of the opening is maximum, and other sizes become polygons. In the same drawings, reference numeral 1 identifies a diaphragm blade; 2 a pivot pin; 3 a diaphragm control ring; and 4 a body. Even if there is some manufacturing error or adjusting error of the diaphragm blades and the maximum aperture opening is not accurate in size, the full open aperture value in the telephoto end barely changes for the aforesaid reason, providing that the front and rear lenses with respect to the diaphragm have effective accurate diameters.

However, in zooming positions other than the telephoto end, the presence of the aforesaid error of the diaphragm blades deviates the full open aperture value by an amount equal to the difference between the ideal and actual values. When the size of the aperture opening deviates toward larger values, the lens becomes faster by that deviation, often causing spherical aberration to increase. The bad influence of this phenomenon is intensified as the zoom ratio increases, and becomes prominent in those positions which are somewhat zoomed from the telephoto end, or midway between the telephoto end and the intermediate region. FIG. 4 depicts variation with zooming of the spherical aberration, as will be seen in many zoom lenses. It is to be understood from FIG. 4 that a slight increase in the full open aperture value when in the positions between the intermediate and the telephoto regions results in rapid deterioration of spherical aberration.

Such a phenomenon appears in most of the zoom lenses which employ the present diaphragm mechanism.

Meanwhile, even the objective lenses and zoom lenses which have been corrected for aberrations have some residual spherical aberration. Particularly in zoom lenses, good correction stability of the spherical aberration throughout the entire zooming range is very difficult to achieve. For example, for the three zooming positions, namely, the wide angle, intermediate and telephoto ones, variation of spherical aberration is corrected. Then, the spherical aberration will be under-corrected between the wide angle end and the intermediate region, and over-corrected between the intermediate region and the telephoto end. Particularly in the large aperture high range zoom lens, these tendencies of spherical aberration are prominent.

Also when focusing is performed from infinity to a minimum object distance, the spherical aberration varies. It is very difficult to perfectly correct the variation of spherical aberration with focusing. For example, the first lens component counting from the front is moved to effect focusing. When the zoom lens having such a focusing provision is sufficiently corrected for spherical aberration with respect to an infinitely distant object, it is the spherical aberration with respect to the object at the minimum distance which tends, in most cases, to be over-corrected if the first lens component is a divergent system, and to be under-corrected if it is a convergent system.

Meanwhile, in the photographic optical systems for single lens reflex cameras, video cameras and cine cameras, the split prism type of distance measuring means is widely used.

FIG. 5A is a perspective view of a split prism, and FIG. 5B is a schematic sectional view of an optical system employing the split prism. FIGS. 6A, 6B and 6C are diagrams illustrating how to focus an objective lens by using the split prism as the distance measuring means. As illustrated in FIG. 6, the light flux used in measuring the object distance is a pair of partial light beams 11 and 12 of a prescribed incidence height from the optical axis vertically symmetrical with respect to the optical axis.

Therefore, if the spherical aberration of the optical system is perfectly corrected, a light flux any height from the optical axis is focused at the same point, permitting distance measuring by the split prism to be accurately performed. Also, even if there is more or less residual spherical aberration, the accuracy of distance measurement can be maintained at some level, provided that the paired light fluxes are the same height from the optical axis. This condition is, however, satisfied only when the center of the eye of the observer coincides with the optical axis. If the eye is out of alignment with the optical axis, the light fluxes used in distance measuring become partial light fluxes of different heights from the optical axis, making it difficult to accurately measure the distance. For example, with the photographic optical system having such a spherical aberration as shown in FIG. 7, there is a situation where one light flux 11 is of a range "b" and the other light flux 12 is of another range "c". Since the focal points of these light fluxes are different from each other, even if the image is in focus on the split prism, the split images appear to be offset, making it impossible to perform accurate distance measurement. When the center of the eye is not out of alignment with the optical axis, the light fluxes, 11 and 12 used are both of the same range "a". But such a situation is here. In most cases, light fluxes different in height from the optical axis are used.

It is to be understood from the foregoing that as most of the zoom lenses used as the photographic optical system have appreciable residual spherical aberration, this spherical aberration lowers the accuracy of distance measurement when the split prism is used for measuring distance.

An object of the present invention is to shut off undesirable light included in the photographic light flux of a zoom lens, and particularly that light flux which causes deterioration of spherical aberration.

Another object of the invention is to prevent the full open aperture value from change during zooming.

Still another object of the invention is to prevent lowering of the accuracy of distance measurement due to zooming or focusing.

A further object of the invention is to provide a zoom lens including at least two lens groups axially movable for zooming with an aperture diaphragm either in a space within, or on the object side of, the rearmost zoom lens group, wherein use is made of an aperture-fixed stop on the image side of the aperture diaphragm with a refracting system intervening therebetween so that on-axis light flux of the full open F-number passes through the margin of the aperture opening of the stop as zooming starts from the wide angle end, and operates from at least 0.9Z to Z of the entire zooming range where Z is the zoom ratio.

A further object is to provide a photographic optical system having a zoom lens the focal length of which is varied by moving at least two lens groups along an optical axis, an aperture diaphragm and a distance measuring means of the split prism type, wherein a stop for restricting only that on-axis light flux the direction of which almost coincides with the wedge direction of the aforesaid split prism in confronting relation to the aperture diaphragm with at least one lens intervening therebetween.

SUMMARY OF THE INVENTION

A zoom lens includes at least two lens groups movable along an optical axis for zooming, the rear lens group including a lens unit. An aperture diaphragm of variable size is arranged on the object side of the lens unit to determine the F-number of the entire system and a light limiting means for limiting light flux is arranged on the image side of the lens unit to be axially movable and occupies a position which substantially coincides with the position at which when in the telephoto side of zooming, the full open on-axial ray and the marginal ray of the off-axial light going to the margin of an image frame intersect with each other.

BRIEF DESCRIPTION OF THE DRAWINGS

FIG. 5A is a perspective view of a split bi-prism, of which an example of the application to an optical system is shown in FIG. 5B.

FIGS. 6A and 6C are diagrams used to explain the principle of distance measuring by the bi-prism.

FIGS. 8A–8D are longitudinal section views of a first embodiment of a zoom lens according to the invention.

FIGS. 10A–10D are longitudinal section views of a second embodiment of a zoom lens according to the invention.

DETAILED DESCRIPTION OF THE PREFERRED EMBODIMENTS

Figure 1:
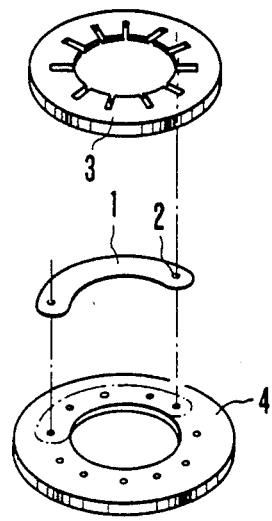
FIG. 1 is an exploded perspective view of an iris diaphragm, in which the full open and closed down positions of the diaphragm blades are shown in FIGS. 2 and 3 respectively.
Figure 2:
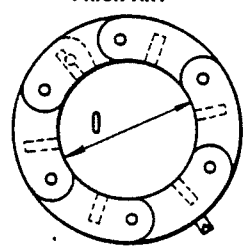
Figure 3:
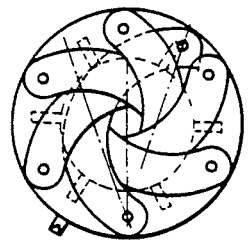
Figure 4:
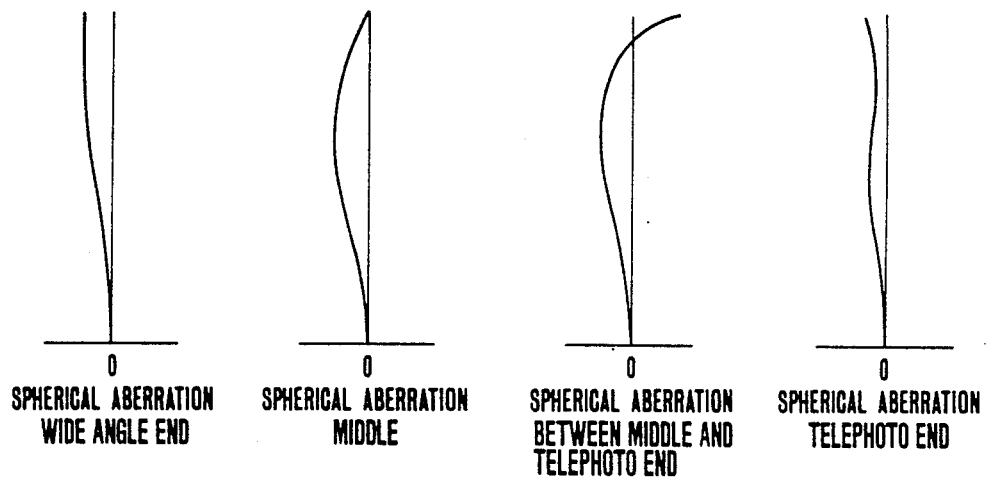
FIG. 4 shows aberration curves illustrating variation of spherical aberration with zooming.
Figure 7:
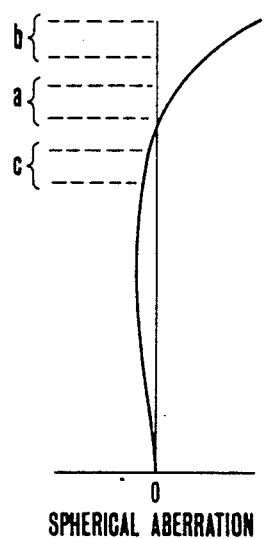
FIG. 7 is a graph illustrating the relationship between the spherical aberration and the distance measuring light flux.
Figure 9A:
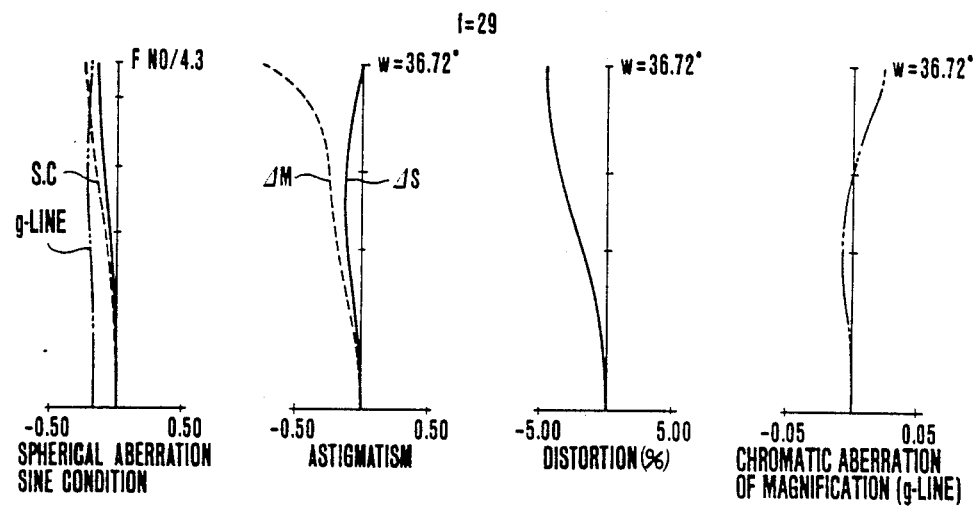
FIGS. 9A–9D are aberration curves of the first embodiment.
Figure 9B:
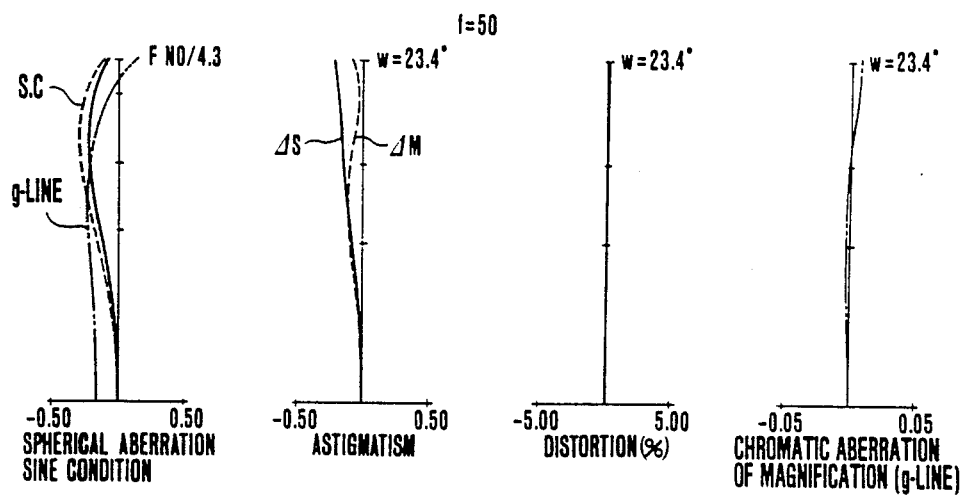
Figure 9C:
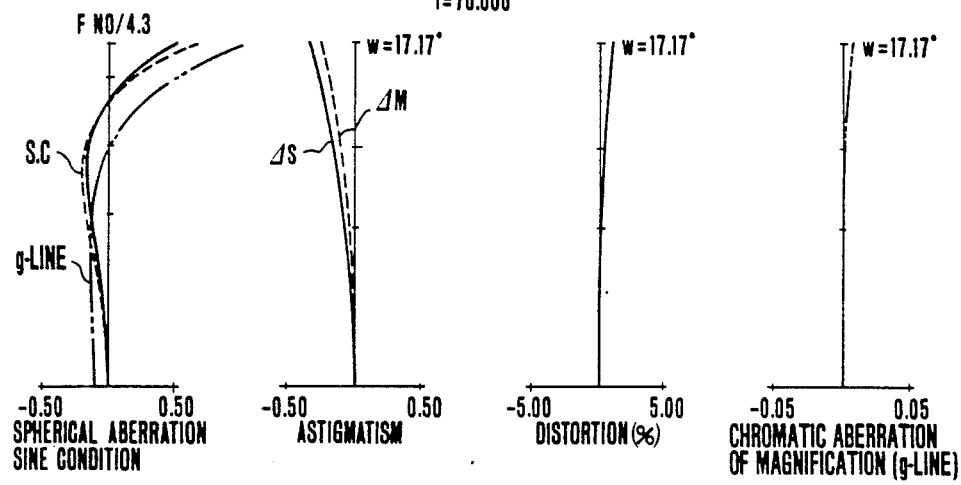
Figure 9D:
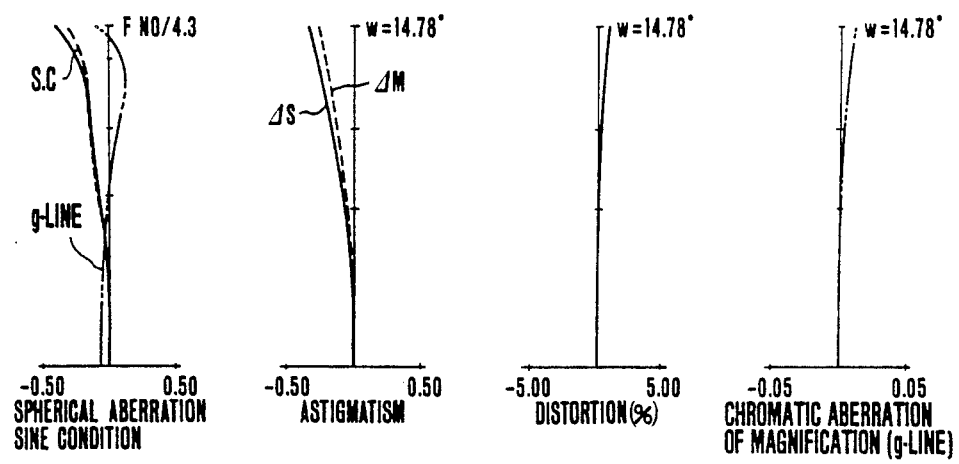
Figure 11A:
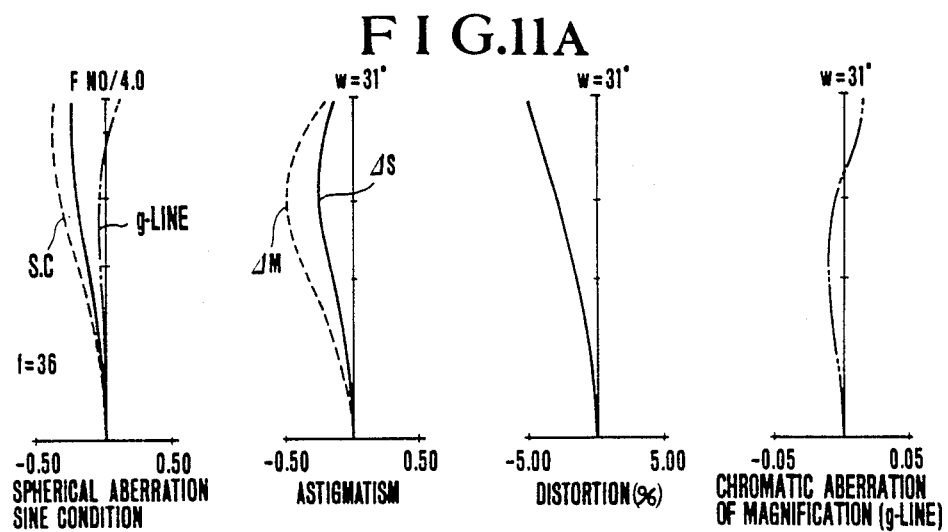
FIGS. 11A–11D are aberration curves of the second embodiment.
Figure 11B:
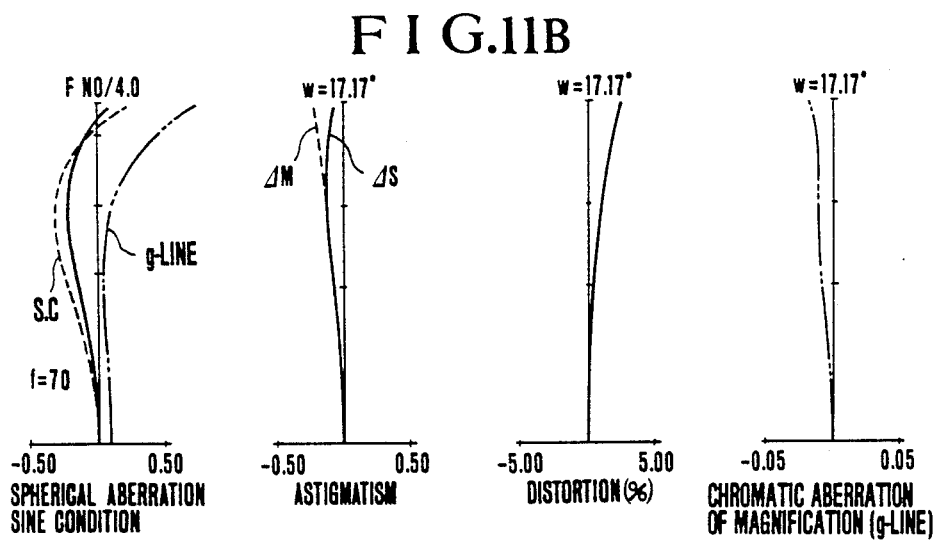
Figure 11C:
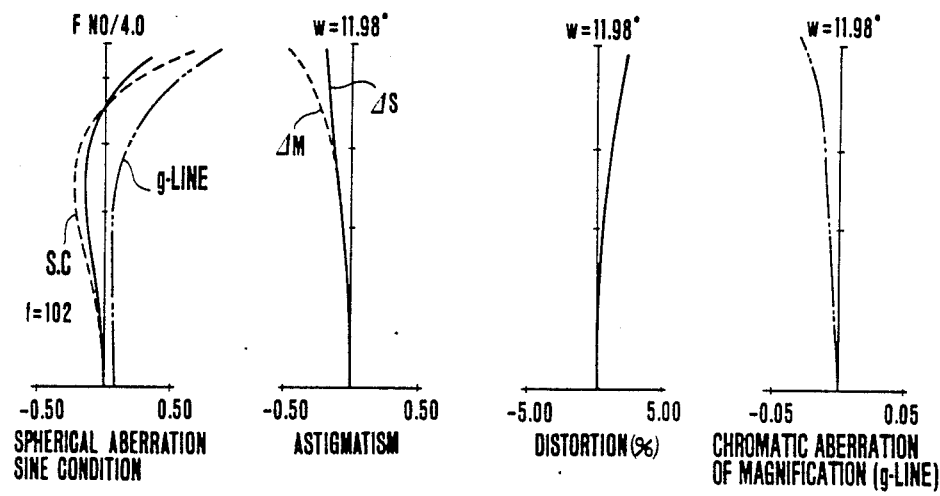
Figure 11D:
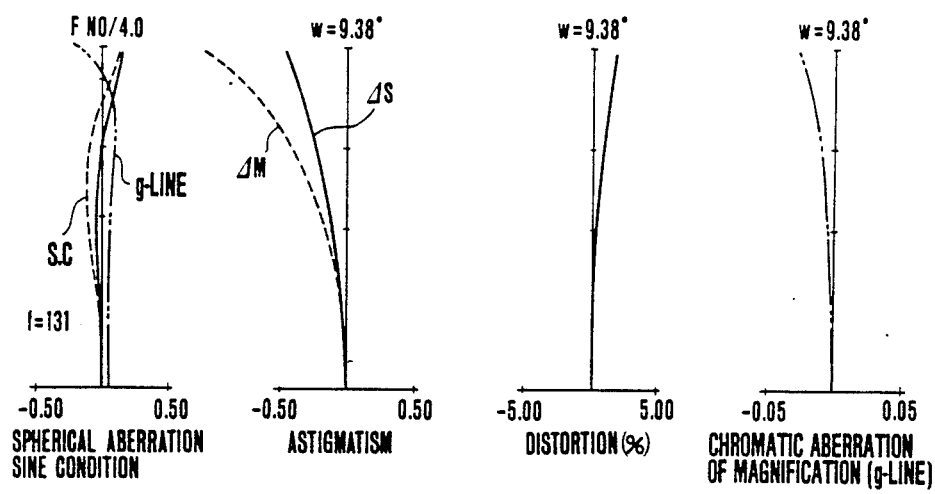

In a zoom lens with an aperture diaphragm within or on the object side of, the rear lens group movable for zooming as shown in FIG. 8A or FIG. 10A respectively, the light flux which passed through the aperture diaphragm is refracted by the refracting system that rearwardly follows. Because the aperture diaphragm when closed down in a portion of the zoom range is not perfectly round as is the shape of the aperture opening, but polygonal, it is extremely advantageous to restrict the light flux of the external component of a perfect circle having an area which corresponds to the area of the aperture shape by arranging an unvariable aperture behind the refracting system. Particularly in the entire zoom range of from 0.9Z to Z in the zoom ratio, it is particularly preferable in the aforesaid zoom types to determine the diameter of the on-axial light flux and the opening of the stop.

And, to better accomplish the object of the invention, it is preferable to set up the aforesaid stop in a position P at which, when zoomed near or at the telephoto end, the on-axial ray of the full open F-number and the marginal ray of the off-axial light flux, which arrives at the margin Q of a picture frame "f" intersect each other.

In the present invention, a stop is provided behind the aperture diaphragm to compensate for the opening of the aperture diaphragm. Particularly when the aperture diaphragm moves with zooming, because the size of the aperture opening greatly changes, the restriction by the stop is effective.

And, it is preferable to move the stop with zooming, but it is not necessary to move it over the entire zooming range. As shown in the embodiments to be described later, it may be moved in only a prescribed region of the zooming range.

Also, the position of the stop may change in any way during zooming providing that the marginal ray of the on-axial light flux passes just adjacent to the opening edge of the stop.

The present invention is next described in more detail in conjunction with each of the embodiments thereof.

FIGS. 8A–8D are lens block diagrams of the first embodiment of the invention. The first embodiment is constructed with three lens groups of negative, positive and negative refractive powers, the first lens group I and the second lens group II being axially moved to effect zooming, an aperture diaphragm being provided within the second lens group II, the range of focal length f=29–82, the aperture value at the full open 1:4.0, and a stop is between the second lens group II and a third lens group III. And, in the telephoto end of FIG. 8D, the upper marginal ray of an on-axial pencil L1 corresponds to the full open aperture and the upper marginal ray of an off-axial pencil L2 going to a margin Q of the image plane intersect each other at a point P. The stop is arranged with its diameter equal to two times the height of the point P from the optical axis. In a focal length region f=70–82, the position of the stop is fixed. As the focal length decreases from f=70 to f=29, the stop moves rearward. In this embodiment, the spherical aberration of the focal length f=70 or thereabouts is very rapidly over-corrected near the maximum aperture. Therefore, if the aperture diaphragm in error increases the full open diameter, when the aperture diaphragm is set at the full open aperture, the over-corrected component of the spherical aberration rapidly increases, causing the optical performance of the full open aperture to deteriorate. To avoid this, the stop is arranged in the aforesaid relation to preserve the high quality. Also, of the off-axial light flux from the uppermost to the intermediate portions of the image format, the upper side light flux can be restricted, thereby the coma flare can be effectively removed.

The second embodiment, as depicted in FIGS. 10A–10D, is a zoom lens comprising four lens groups I, II, III, IV of positive, negative, positive and positive refractive powers, with f=36–131 and F-number 1:4.0. An aperture diaphragm lies midway between the second lens group II and the third lens group III and moves as a unit with the first lens group I when zooming. The second lens group II and the fourth lens group IV remain stationary during zooming. The third lens group III moves axially during zooming. The stop lies midway between the third lens group III and the fourth lens group IV at a location where, when in the telephoto end, the upper marginal ray of the on-axial light flux corresponding to the full open aperture and the upper margin ray of the off-axial light flux transmitting to the upper extra-axial image point intersect each other. The diameter of the opening of the stop is equal to twice the height of the intersection point from the optical axis. The stop remains stationary in a region of the focal length f=70–131, and moves rearward at it varies from f=70 to f=36.

In the second embodiment, the spherical aberration near f=100 is most rapidly over-corrected near the maximum aperture. The use of the stop, therefore, provides a similar advantage to that described in example 1.

In the specific examples 1 and 2, the on-axial light flux of the full open F-number passes just adjacent to the edge of the opening of the stop when the zoom ratio is 0.856 or 0.534 respectively.

Thus, it is preferable in the optical performance to provide a stop for adjusting the light flux over the entire zooming range of from at least 0.9Z to Z. For the zooming positions of more than 0.9Z, because the shape of the aperture opening of the diaphragm becomes nearly perfectly round, the effect by the stop is lower.

Though, in examples 1 and 2, the full open F-number remains the same during zooming, it is not always necessarily the same. For example, in zooming to a telephoto end, the zoom lens may be slower. For such a lens, the stop must be moved forward as the speed decreases so that the stop can always take its place at the intersection point with the off-axial light flux, thereby the flare can be advantageously removed.

As has been described above, in the present invention, if the diameter of the full opening of the aperture diaphragm is falsely increased by the manufacturing or adjusting error of the aperture diaphragm when in zooming positions other than the telephoto end, it is in a range of at least 0.9Z to Z in the zoom ratio that the full open F-number is determined by the inner diameter of the stop. Therefore, the light flux of the aforesaid error can be cut by the stop, so that the imaging performance at the full open aperture can be excellently maintained. Furthermore since, in the aforesaid range, the value of the full open F-number can be accurately preserved, it is possible to determine an accurate exposure value in various types of light metering particularly in the single lens reflex cameras.

Next, the numerical examples of the invention are shown, where Ri is the radius of curvature of the i-th lens surface counting from the front, Di is the i-th lens thickness or air space counting from the front, and Ni and $\nu i$ are the refractive index and Abbe number of the glass of the i-th lens element counting from the front respectively.

| Lens Data 1 | | | |
|---|---|---|---|
| f = 29~82 | F No. 1:4.3 | $2\omega$ = 73.45°~29.56° | |
| R1 = 132.00 | D1 = 5.11 | N1 = 1.58913 | $\nu 1$ = 61.0 |
| R2 = 624968.00 | D2 = 0.15 | | |
| R3 = 75.02 | D3 = 1.93 | N2 = 1.80400 | $\nu 2$ = 46.6 |
| R4 = 22.43 | D4 = 8.73 | | |
| R5 = 307.82 | D5 = 5.44 | N3 = 1.63636 | $\nu 3$ = 35.4 |
| R6 = −60.71 | D6 = 0.50 | | |
| R7 = −52.81 | D7 = 1.41 | N4 = 1.81600 | $\nu 4$ = 46.6 |
| R8 = 91.68 | D8 = 1.83 | | |
| R9 = 37.72 | D9 = 2.96 | N5 = 1.84666 | $\nu 5$ = 23.9 |
| R10 = 68.46 | D10 = Variable | | |
| R11 = 49.93 | D11 = 3.60 | N6 = 1.65160 | $\nu 6$ = 58.6 |
| R12 = −596.25 | D12 = 1.94 | | |
| R13 = Diaphragm | D13 = 0.50 | | |
| R14 = 27.79 | D14 = 3.88 | N7 = 1.65160 | $\nu 7$ = 58.6 |
| R15 = 75.08 | D15 = 0.15 | | |
| R16 = 27.17 | D16 = 4.03 | N8 = 1.65160 | $\nu 8$ = 58.6 |
| R17 = 79.63 | D17 = 1.17 | | |
| R18 = −4531.89 | D18 = 3.42 | N9 = 1.84666 | $\nu 9$ = 23.9 |
| R19 = −90.47 | D19 = 1.50 | N10 = 1.80518 | $\nu 10$ = 25.4 |
| R20 = 17.28 | D20 = 3.09 | | |
| R21 = 109.23 | D21 = 3.30 | N11 = 1.74950 | $\nu 11$ = 35.3 |
| R22 = −53.17 | D22 = Variable | | |
| R23 = Stop | D23 = Variable | | |
| R24 = −45.60 | D24 = 1.30 | N12 = 1.81600 | $\nu 12$ = 46.6 |
| R25 = −673.74 | D25 = 4.03 | N13 = 1.58144 | $\nu 13$ = 40.7 |
| R26 = −37.43 | | | |

| f | 29 | 50 | 70 | 82 |
|---|---|---|---|---|
| D10 | 42.9738 | 15.6183 | 4.8063 | 0.8339 |
| D22 | 0.5714 | 7.9314 | 10.5179 | 19.1714 |
| D23 | 3.1000 | 10.7935 | 22.5580 | 22.5580 |
| R13 | 14.946 | 19.361 | 23.864 | 26.810 |

-continued

Lens Data 1

| Diameter R23 | 15.0 | 15.0 | 15.0 | 15.0 |
|---|---|---|---|---|
| Diameter | | | | |

Lens Data 2

| f = 36~131 | F No. = 4.0 | | 2ω = 62°~18.76° | |
|---|---|---|---|---|
| R1 = 140.85 | D1 = 2.50 | N1 = 1.80518 | ν1 = 25.4 | |
| R2 = 54.67 | D2 = 9.30 | N2 = 1.65844 | ν2 = 50.9 | |
| R3 = −2123.39 | D3 = 0.12 | | | |
| R4 = 56.28 | D4 = 5.97 | N3 = 1.69680 | ν3 = 55.5 | |
| R5 = 270.49 | D5 = Variable | | | |
| R6 = 214.21 | D6 = 1.50 | N4 = 1.88300 | ν4 = 40.8 | |
| R7 = 21.30 | D7 = 5.58 | | | |
| R8 = −59.61 | D8 = 1.20 | N5 = 1.88300 | ν5 = 40.8 | |
| R9 = 73.22 | D9 = 2.32 | | | |
| R10 = 44.56 | D10 = 4.54 | N6 = 1.84666 | ν6 = 23.9 | |
| R11 = −41.57 | D11 = 1.81 | | | |
| R12 = −32.13 | D12 = 1.05 | N7 = 1.83400 | ν7 = 37.2 | |
| R13 = −177.59 | D13 = Variable | | | |
| R14 = Diaphragm | D14 = Variable | | | |
| R15 = 130.36 | D15 = 2.45 | N8 = 1.65844 | ν8 = 50.9 | |
| R16 = −224.31 | D16 = 0.12 | | | |
| R17 = 60.43 | D17 = 2.45 | N9 = 1.65844 | ν9 = 50.9 | |
| R18 = 145.24 | D18 = 0.12 | | | |
| R19 = 39.25 | D19 = 2.26 | N10 = 1.72342 | ν10 = 38.0 | |
| R20 = 89.12 | D20 = 0.12 | | | |
| R21 = 25.86 | D21 = 7.44 | N11 = 1.51742 | ν11 = 52.4 | |
| R22 = −247.59 | D22 = 5.90 | N12 = 1.84666 | ν12 = 23.9 | |
| R23 = 19.58 | D23 = 4.92 | | | |
| R24 = 143.91 | D24 = 3.32 | N13 = 1.67003 | ν13 = 47.3 | |
| R25 = −48.33 | D25 = Variable | | | |
| R26 = Stop | D26 = Variable | | | |
| R27 = −52.38 | D27 = 1.4 | N14 = 1.77250 | ν14 = 49.6 | |
| R28 = 486.72 | D28 = 2.48 | N15 = 1.51742 | ν15 = 52.4 | |
| R29 = −332.31 | D29 = 2.45 | | | |
| R30 = 128.70 | D30 = 4.83 | N16 = 1.62299 | ν16 = 58.2 | |
| R31 = −53.21 | | | | |

| f | 36 | 70 | 102 | 131 |
|---|---|---|---|---|
| D5 | 1.2510 | 15.6930 | 22.4160 | 26.1510 |
| D13 | 25.8496 | 11.4076 | 4.6846 | 0.9496 |
| D14 | 4.1221 | 4.4405 | 3.6200 | 1.8277 |
| D25 | 1.3912 | 0.7147 | 8.2583 | 13.7856 |
| D26 | 4.2000 | 19.0000 | 19.0000 | 19.0000 |
| R14 Diameter | 17.32 | 20.26 | 22.27 | 24.37 |
| R26 Diameter | 17.42 | 17.42 | 17.42 | 17.42 |

Figure 12A:
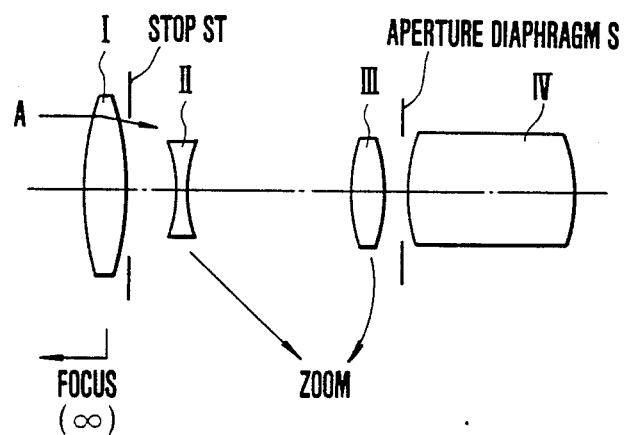
FIG. 12A is a schematic section view of a third embodiment of a zoom lens.
Figure 12B:
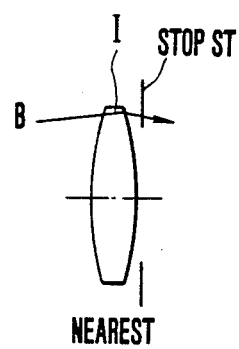
FIG. 12B is a fragmentary section view of the third embodiment.
Figures 13A, 13B, 13C:
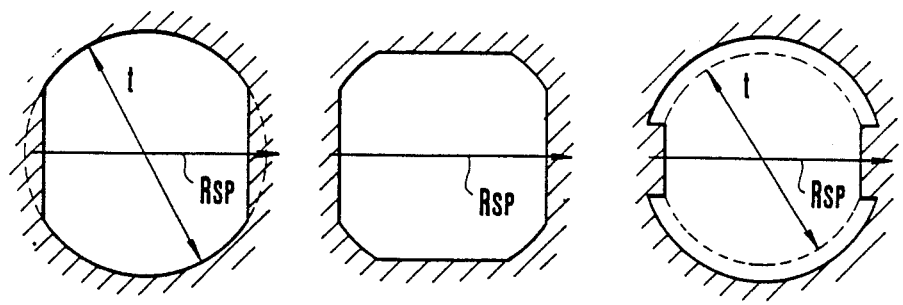
FIGS. 13A–13F are respectively plan views of different stops ST.
Figures 13D, 13E, 13F:
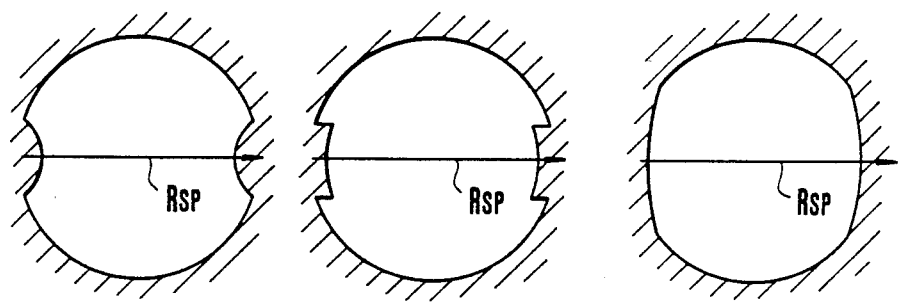

FIGS. 12A and 12B show a third embodiment, where I is the first lens component for focusing, II and III are the second and third lens components for zooming respectively, and IV is the fourth lens component for forming an image. The first to the fourth lens components I, II, III, IV constitute a zoom lens. Reference symbol S identifies an aperture diaphragm, and ST a stop. An example of a distance measuring system is depicted in FIG. 5B where reference symbol M identifies a half mirror, SP a split prism, F a photographic film, and FD a finder. The opening of the stop ST is formed as shown in, for example, FIGS. 13A to 13F with a pair of expanded portions for restricting light flux symmetrically in at least one direction $R_{SP}$. Preferably, in a direction of shorter distance from the optical axis, the on-axial light flux is restricted. The wedge direction $R_P$ of the split prism SP shown in FIG. 5A and the direction $R_{SP}$ in which the light flux is restricted almost coincide with each other. In FIG. 12A, the stop ST is added to the first lens component I so that it moves during focusing. In general, when focusing is performed by the first lens component I, a most marginal ray B of the on-axial light flux from an object at the minimum distance is incident on the first lens component I at a higher height than that of the incidence of a most marginal ray A of the on-axial light flux from an infinitely distant object (on the assumption that the full open F-number is the same). For example, when in the telephoto end, by the stop ST, the on-axial light flux for the infinitely distant object is not restricted, but the on-axial light flux for the close object can be restricted, thus making it possible to restrict spherical aberration with the close object. That is, because the light flux used in measuring the distance can be cut in portion, accuracy of distance measurement can be increased. The stop ST usable for this purpose may be formed to any shape which is not confined to those shown in FIGS. 13A-13F, providing that at least only one direction is restricted. And, the stop ST at this time is preferably spaced apart from the aperture diaphragm S by a lens system, because the off-axial light flux is not restricted. Though the illustrated embodiment of FIG. 12A has been described in connection with the stop ST movable along with the focusing or first lens component I to restrict the on-axial light flux, the stop ST may be otherwise arranged to move along with one of the lens components I, II, III, IV for zooming, for example, the second II or the third III lens component to restrict the on-axial light flux in zooming, thereby highly accurate distance measurement can be obtained over the entire zooming range.

Instead of the stops R23 and R26 of the zoom lenses I, II, III, IV shown in FIGS. 8A and 10A, it is possible to use stops ST depicted in FIGS. 13A-13F.

Figure 14:
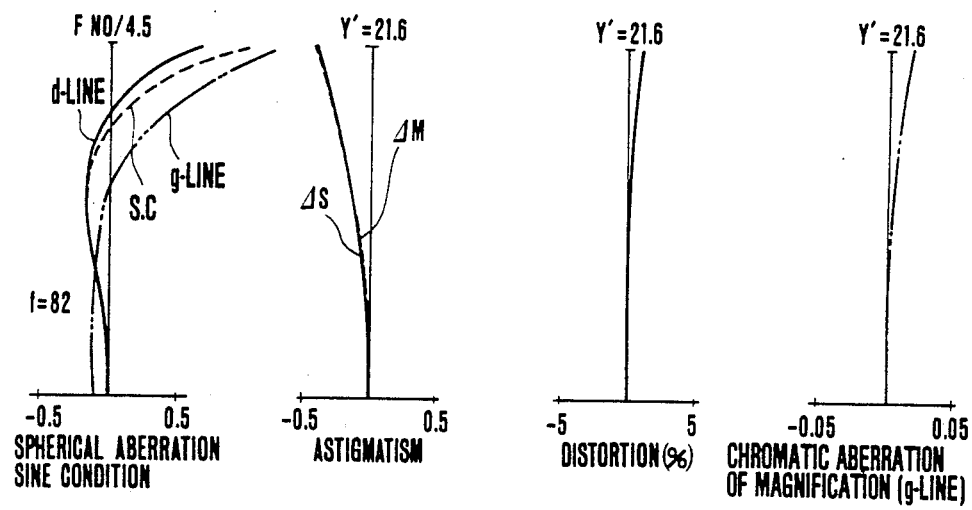
FIGS. 14 and 15 are aberration curves.
Figure 15:
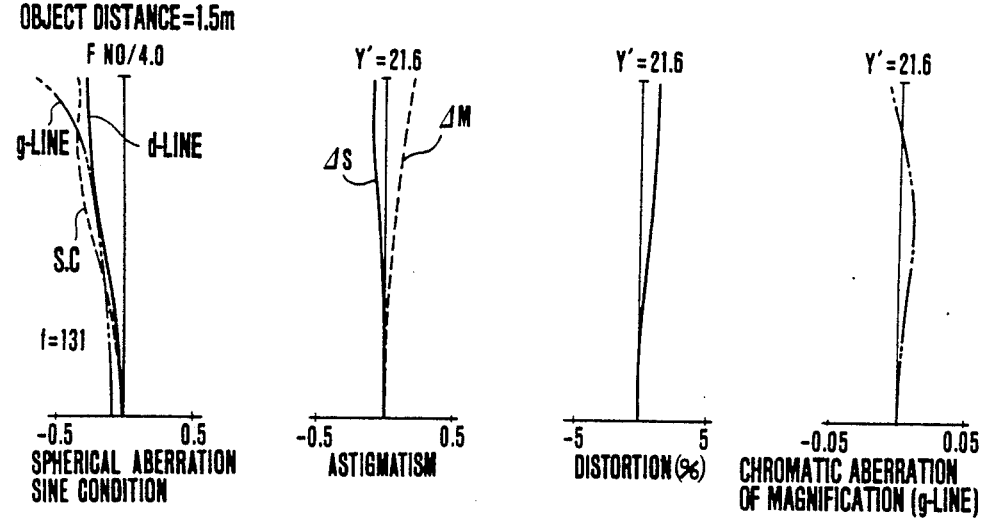

The zoom lens shown in FIG. 8A is constructed with three lens groups of negative, positive and negative refractive powers in this order from the front, the first lens group I being moved to effect focusing, and the first and second lens groups I and II being moved axially but in differential relation to effect zooming. The aperture diaphragm S is provided within the second lens group II. The range of focal length is f=29–82 with the full open aperture 1:4.3. The stop ST is between the second lens group II and the third lens group III in the position P at which the marginal ray L1 of the on-axial light flux corresponding to the full open aperture and the marginal ray L2 of an off-axial light flux going to the extra-axial image point intersect each other on the opposite side of at least one lens group to the aperture diaphragm S. The shape of the opening of the stop ST is similar to that shown in FIG. 13A. That is, the vertical diameter is equal to twice the height of the intersection point P from the optical axis, and the lateral distance is smaller by 10% than the diameter to restrict both sides of the light flux. By using such an arrangement of the stop ST on the opposite side of the lens group to the aperture diaphragm S, the on-axial light flux is effectively restricted without having to influence the off-axial light flux. And, when zooming in a region of f=70–82, the stop ST remains stationary, and when zooming from f=70 to f=29, it is moved rearward. In this embodiment, the spherical aberration of about f=70 is most rapidly over-corrected near the maximum aperture. Also with the object at a distance of 1.5 m in the telephoto end (focusing being performed by the first lens group), the spherical aberration is rapidly over-corrected. For this reason, the stop ST is used to cut the maximum on-axial light flux in the lateral direction by 10%. Therefore, the spherical aberration is at a height equal to 0.9 times the maximum. As will be understood from the aberration curves of FIG. 14, the spherical aberration for f=70 and f=82 with an object at 1.5 meters if taken at 0.9 becomes a very good spherical aberration. Therefore, when the light flux of lateral direction is used for measuring the object distance with the split prism SP, because the influence of the aberration is lesser in that direction, an accurate measurement of the distance can be made with ease, despite the center of the eye of the observer is more or less taken out of alingment with the optical axis. Also in the region of f=70–82, the speed at the full open aperture is slightly decreased to F-number=4.3827. But this value is only 1.9% slower than 4.3, falling sufficiently in the allowable range. Also the stop restricts the marginal ray of the off-axial light flux to the extra-axial to the intermediate zone of the image, thereby the coma flare is also effectively removed, contributing to an improvement of the image quality.

The zoom lens shown in FIGS. 10A–10D is constructed with four lens groups of positive, negative, positive and positive refractive powers in this order from the front and has a range of f=36–131 with F-number=4.0. An aperture diaphragm lies in a space between the second lens group II and the third lens group III, and moves along with the first lens group I when zooming. The second and fourth lens groups II and IV remain stationary during zooming, and the third lens group III moves. A stop ST lies in a space between the third lens group III and the fourth lens group IV at a location where when in the telephoto end the marginal ray of the on-axial light flux corresponding to the full open aperture and the marginal ray of the off-axial light flux going to the extra-axial image point intersect each other. The shape of the opening of the stop ST is similar to that shown in FIG. 13C likewise as has been described above. And, as zooming in a region of f=70–131, the stop ST remains stationary, and as zooming from f=70 to f=36, it moves rearward. In this embodiment, the spherical aberration of about f=100 is rapidly over-corrected near the maximum aperture. With the telephoto end when focused down to 1.5 m, under-correction of spherical aberration results. For this reason, the aforesaid stop is used to cut the height of incidence from 0.9 to 1.0, so that as the worst portion of the spherical aberration is improved, an accurate measuring of the distance becomes possible easily. Thus, in this embodiment, the stop is made to move from midway of zooming, thereby the light flux is effectively restricted. And, the direction $R_{SP}$ in which the on-axial light flux is restricted by the stop ST is made almost coincident with the direction $R_P$ of the wedges of the split prism likewise as in the foregoing embodiment, so that a photographic optical system of improved accuracy of distance measurement can be obtained.

It is to be noted that the photographic optical system of the invention can be also applied to automatic focus detectors. That is, two split images formed adjacent the split prism are electrically read out and when these two split images are in coincidence is detected. With this, an automatic focus detector of high accuracy can be obtained.

It is also to be noted that the photographic optical system of the invention is capable of measuring light at the full open aperture. When in measuring the distance, the interval between the expanded portions of the stop for shutting off undesirable light is 13.5 for the lens data 1 and 15.68 for the lens data 2.

What is claimed is:
1. A zoom lens comprising:
at least two lens groups movable along an optical axis for zooming, the rear one of said lens groups including a lens unit;
an aperture diaphragm of variable size arranged on the object side of said lens unit to determine the F-number of the entire system; and
light limiting means for limiting light flux arranged on the image side of said lens unit to be axially movable and occupying a position substantially coincident with the position at which when in the telephoto side of zooming, the full open on-axial ray and the marginal ray of the off-axial light flux going to the margin of an image frame intersect with each other.

2. A zoom lens according to claim 1, wherein said light limiting means is a stop having a round opening.

3. A zoom lens according to claim 1, wherein said light limiting means is a stop having expanded portions into an opening thereof in symmetry with respect to an optical axis.

4. A zoom lens according to claim 1, wherein said rear lens group includes another lens unit on the object side of said light limiting means.

5. A zoom lens according to claim 1, wherein the front lens group of said lens groups has a negative refractive power and the rear lens group has a positive refractive power, and further comprising a third lens group on the image side of said lens groups.

6. A zoom lens according to claim 1, wherein any of said lens groups has a positive refractive power, and further comprising a fixed negative lens group between said lens groups and another fixed lens group at the rearmost position.

7. A zoom lens comprising:
at least two lens groups axially movable for zooming, the rear one of said lens groups including a lens unit;
an aperture diaphragm of variable opening size arranged on the object side of said lens unit to determine the F-number of the entire system; and
a stop having a constant size of opening arranged on the image side of said lens unit,
wherein the position of said stop is controlled during zooming so that the diameter of the full open on-axial light flux is substantially coincident with the diameter of opening of said stop in a range from at least 0.9Z to Z where Z is the zoom ratio with the wide angle end as the start point.

8. A zoom lens according to claim 7, wherein said stop has a range of movement and a range of standstill during zooming.

9. A zoom lens according to claim 7, wherein said stop occupies a position substantially coincident with the position where when in the telephoto side of zooming, the full open on-axial ray L1 and the marginal ray of the off-axial light flux L2 going to the margin Q of an image plane intersect each other.

10. A zoom lens according to claim 7, wherein said rear lens group includes another lens unit on the object side of said stop.

11. A zoom lens according to claim 7, wherein the front lens group of said lens groups has a negative refractive power and the rear lens group has a positive refractive power, and further comprising a third lens group on the image side of said lens groups.

12. A zoom lens according to claim 7, wherein any of said lens groups has a positive refractive power, and further comprising a fixed negative lens group between said lens groups and another fixed lens group at the rearmost position.

13. An optical system comprising:
a zoom lens capable of zooming and focusing, said zoom lens including a plurality of movable lens units arranged to move along an optical axis for zooming, an aperture diaphragm S of which the size of opening is variable to determine the F-number of the zoom lens, and a stop ST arranged on the opposite side of a lens group to said aperture diaphragm S; and
a bi-prism ST for examining an object image having a split direction $R_P$,
whereby said stop ST is provided with expanded portions for limiting light.

14. An optical system according to claim 13, wherein said zoom lens includes a focusing lens unit movable for focusing, and wherein said stop is arranged just after said focusing lens unit.

15. An optical system according to claim 13, wherein said aperture diaphragm S moves as a unit with the rear movable lens unit, and wherein said stop ST is arranged on the image side of said aperture diaphragm S.

16. An optical system according to claim 13, wherein said zoom lens further includes a fixed lens unit at the rearmost position, and wherein said stop ST is arranged between said fixed lens unit and said aperture diaphragm S.

17. An optical system according to claim 13, wherein said stop ST occupies a position substantially coincident with the position at which when in the telephoto side of zooming, the full open on-axial ray L1 and the marginal ray of the off-axial light flux L2 going to the margin Q of an image plane intersect each other.

* * * * *